United States Patent
Baba et al.

(10) Patent No.: US 7,339,688 B1
(45) Date of Patent: Mar. 4, 2008

(54) PROCESSOR FOR A REQUESTED PRINT JOB

(75) Inventors: Masafumi Baba, Yokohama (JP);
Akihiko Nakamaru, Kawasaki (JP);
Jin Kojima, Yokohama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 325 days.

(21) Appl. No.: 09/703,869

(22) Filed: Nov. 2, 2000

(30) Foreign Application Priority Data

Feb. 29, 2000 (JP) .............................. 2000-054172

(51) Int. Cl.
*G06F 15/00* (2006.01)

(52) U.S. Cl. .................................................. 358/1.15

(58) Field of Classification Search .......... 358/1.1–1.9, 358/1.11–1.18, 501–503, 523, 524, 444; 347/5, 111, 110, 171, 224; 349/18–21, 38, 349/75, 83, 402; 709/102, 103, 201, 219, 709/211–216, 238, 314; 710/263, 267, 310; 711/100, 134
See application file for complete search history.

(56) References Cited

U.S. PATENT DOCUMENTS

| | | | |
|---|---|---|---|
| 5,287,434 A * | 2/1994 | Bain et al. .................. | 358/1.15 |
| 5,467,434 A * | 11/1995 | Hower, Jr. et al. ......... | 358/1.15 |
| 5,619,624 A * | 4/1997 | Schoenzeit et al. ......... | 345/418 |
| 6,047,111 A * | 4/2000 | Sugiura et al. ............. | 358/1.15 |
| 6,213,652 B1 * | 4/2001 | Suzuki et al. .............. | 358/1.15 |
| 6,545,766 B1 | 4/2003 | Shima et al. | |

FOREIGN PATENT DOCUMENTS

| JP | 1-253464 A | 10/1989 |
|---|---|---|
| JP | 6-187121 A | 7/1994 |
| JP | 07-098691 A | 4/1995 |

(Continued)

OTHER PUBLICATIONS

Microsoft Press Computer Dictionary, Third Edition, Microsoft Press.*

(Continued)

*Primary Examiner*—David Moore
*Assistant Examiner*—Saeid Ebrahimi
(74) *Attorney, Agent, or Firm*—Westerman, Hattori, Daniels & Adrian, LLP.

(57) ABSTRACT

In a print server device, print data reading and a printing process are performed in parallel so as to reduce the printing time and the printing order of print jobs is automatically or optionally changed.

A print server device 1 stores print data of a print job 3 accepted thereby, reads out the print data in accordance with a print request command and has the read out print data analyzed and processed at a device control filter 8 for output to a printer 2. A control unit 9 sequentially reads out the print data for supply to the device control filter as a part of the print data is started to be stored. In addition, the control unit 9 puts the print job in a print wait condition. The print jobs are selected in accordance with a priority following a specific condition so as to be released from the print wait condition, and the print data of the print files is read out for supply to the device control filter.

3 Claims, 7 Drawing Sheets

FOREIGN PATENT DOCUMENTS

| | | |
|---|---|---|
| JP | 08-324071 A | 12/1996 |
| JP | 9-269880 A | 10/1997 |
| JP | 10-11234 A | 1/1998 |
| JP | 10-214164 A | 8/1998 |
| JP | 10-254662 A | 9/1998 |
| JP | 10-289072 A | 10/1998 |
| JP | 2000-6474 A | 1/2000 |

OTHER PUBLICATIONS

JP 2000-054172 Office Action dated Aug. 8, 2006.

* cited by examiner

Fig.5

PROCESSOR FOR A REQUESTED PRINT JOB

BACKGROUND OF THE INVENTION

1. Field of the Invention

The present invention relates to a processor for printing a requested print job via a recording medium or a network, and more particularly to a processor in which a function to execute a print job is extended.

2. Description of the Related Art

In general, if a printer is connected to a computer main body a user is using, when a text file is created, the contents of the file are stored after confirming the contents by looking at what is displayed on a screen of the computer main body or what is printed through the printer.

However, as a system, in which a plurality of users share a common printer for printing files they create, there is a print system in which a network is configured by UNIX, which is an operating system or OS that can deal with a multiple users and in which one or a plurality of printers are connected to the network, whereby a plurality of users perform printing on the printers via the network. With this system, the printers are not used exclusively by the specific users but the printers are configured so as to be used by all the users having accesses to the system.

In order to realize a system like this, a server device is connected to the network, and one or a plurality of printers are connected in turn to the server device.

When there are requests for printing made by the respective users, an lp print service program is activated and print data of the print requests from the respective users are printed in order.

In this print system, the print data stored in the medium or the print data requested for printing via the network is read and the print data so read is then outputted to the printer for printing. However, when the requested print data has been printed on the printer, the print server device is configured so as to automatically delete the print file stored in a print data storing unit.

Even when there occurs a jam or the like on the printer side, as long as the print file remains in the print data storing unit, it is possible to recover the print file. However, since the print file is deleted as soon as the printing of the file is completed, it is not possible to print the data of the same print file. To cope with this, in a case where the same print data is to be reprinted on the printer, another request for printing the same print data has to be made.

In addition, even in a case where the print data from the medium or the network is outputted directly from a print job reading unit to the printer, if there occurs a jam or a failure in printing a specific page on the printer side, it is not possible to perform re-printing without another request for printing for the same print data.

Furthermore, although it can be conceived that the print file is left at the print data storing unit without being automatically deleted, in order to deal with a tremendous number of requests for printing jobs, the capacity of the storing unit has to be gigantic. Moreover, the operator is required to perform an additional operation of deleting the print data which has been printed by confirming that the data has become unnecessary.

Additionally, in a case where a print job requested by the print server device is printed on the printer, the print file of the print job in question is stored in the print data storing unit, and the requested printing is performed after the print data is read in the lp print service unit. This causes a problem that it takes time since the print job arrives at the print server device before the requested printing is initiated on the printer.

As is described above, it can be conceived that the print data is outputted directly from the print job reading unit to the printer and, in this method, since the print data is outputted to the printer without being read in the storing unit on its way to the printer, the time required from the request to the printing can be reduced.

However, although even if this method can reduce the time, in the event that there occurs trouble on the printer side or that the same print data is to be re-printed, not only does the method require another request for printing but also an advantage inherent in the lp print service, that a multiple accesses from a plurality of users can be dealt with, is lost.

To cope with this, a problem must be solved that the time required from a request for printing to the completion of the requested printing is reduced while making effective use of the lp print service.

Additionally, in a print system constituted by a print server device and a printer, when a request for printing is made, the lp print service receives a print job and outputs print data after spooling the same data.

At this time, since the lp print service is designed to normally output requested print jobs in a sequential fashion, in a case where the printing sequence is to be changed, the printing sequence has to be changed by separately making use of the function of the lp print service.

The print jobs accepted by the lp print service have attribute values of priority and the lp print service is provided with a function to change the printing sequence by changing the priority in printing sequence by changing in turn the attribute values.

However, this function can be used for a single print job, and therefore, in a case where a plurality of print jobs are spooled, there are caused several problems.

Namely, the priority has to be changed for every print job each time. Additionally, this function is a function to determine the priority by numerical values, and since the numerical value has a range (with the UNIX, 0 to 39), in a case where the number of print jobs exceeding the range are stored, printing cannot be performed in an expected sequence. Furthermore, a plurality of print jobs are stored, since the stored print jobs are printed one by one end, if the priority is changed for each printing, printing may be performed in an erroneous sequence depending on changing timings.

In a case where print jobs accepted and spooled by the lp print service unit are to be printed in a sequence following a specific condition, the conventional technologies have not been able to provide effective means. Printing is performed in an erroneous sequence, which is attributed to the fact that a process in which the priority is changed and a process in which the lp print service unit outputs to a device control filter cannot be performed in synchronism with each other.

Due to this, once a specific condition is set, the print priority must be determined in accordance with the condition so determined and the print sequence must be automatically changed.

To this end, an object of the present invention is to increase the convenience of a print server device by making effective use of the function of an lp print service and further improving the function as the print server device.

SUMMARY OF THE INVENTION

With a view to solving the problems, according to an aspect of the present invention, there is provided a processor comprising a processing unit for registering a print request command of an accepted print job, storing a print file of the print job and reading out print data of the file in accordance with the print request command and a device control filter for analyzing and processing the print data read out by the processing unit so as to output the print data so analyzed and processed to a printer, the processor being characterized in that the processing unit sequentially reads out the print data in accordance with the print request command for supply to the device control filter as a part of the file is stored, thereby implementing print data reading and print processing in a parallel fashion, whereby a printing time can be reduced.

Furthermore, the processing unit of the processor puts the print job in a print wait condition, releases the print job from the print wait condition by selecting the print request command in accordance with a specific condition for determining an output sequence and reads out print data of the released print job for supply to the printer, whereby the printing sequence of the print job can be automatically or optionally changed through a simple operation.

BRIEF DESCRIPTION OF THE DRAWINGS

The above object and features of the present invention will be more apparent from the following description of the preferred embodiments with reference to the accompanying drawings, in which.

DESCRIPTION OF THE PREFERRED EMBODIMENTS

Before describing embodiments of the present invention, the related art and disadvantages inherent therein will be described with reference to figures in association therewith.

Figure 1:
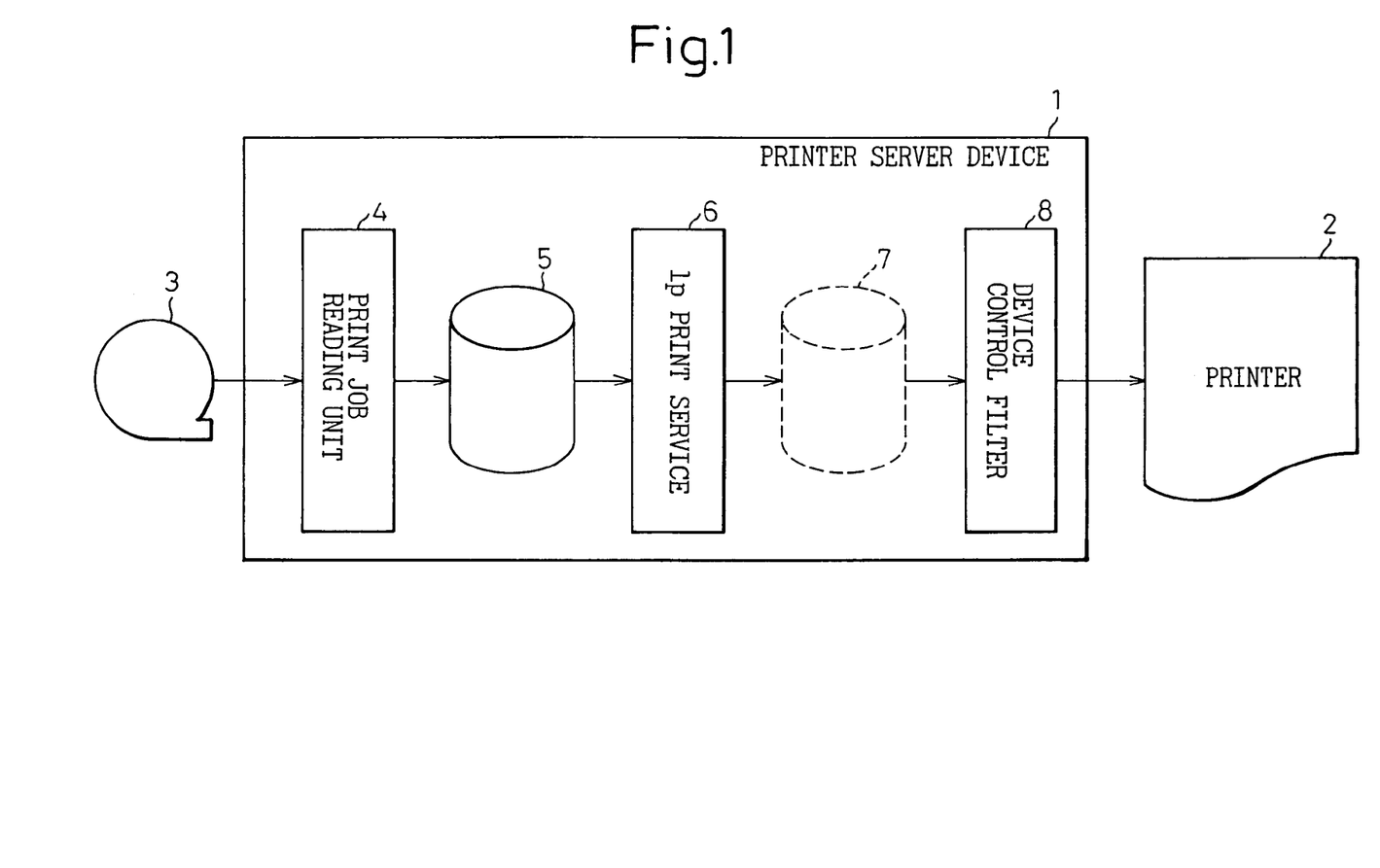
FIG. 1 is a schematic diagram showing the configuration of a conventional print server device.

The basic system configuration of a conventional print server device is configured as shown in FIG. 1.

A print server device 1 is composed of a print job reading unit 4, a print data storing unit 5, an lp print service unit 6, a spool file 7 and a device control filter 8. The print job reading unit 4 is designed to accept a print job 3 from the network, and a printer 2 is connected to the device control filter 8. The print job 3 may be not only print data requested for through the network but also a request for printing data stored in a medium such as a magnetic tape, a magneto-optical disc (MO) and a CD-ROM.

Here, when there is a request for a print job 3 coming from a user via a network, the print job reading unit 4 accepts and registers this request, reads print data of the print job 3 and stores a print file in the print data storing unit 5, and outputs a print request command to the lp print service unit 6 under an lp file name. Then, the lp print service unit 6 writes the print data from the print data storing unit 5 into the spool file 7.

Following this, when the print data is written in the spool file 7, the device control filter 8 is activated and reads out the print data written in the spool file 7 for analysis and conversion thereof. Then, the device control filter 8 analyzes and processes the print data and converts the data into a print format for the printer 2. The data processed herein is sent to the printer 2 for printing.

Here, another storing unit may be prepared separately from the print data storing unit 5 is prepared, so that the print data written in the print data storing unit 5 is temporarily in the separately provided storing unit.

Then, when data of the print data file has been printed, even if the print file in the print data storing unit 5 is automatically deleted, since the print data stored in the separate storing unit is left, when the print data requested for printing is to be re-printed, the print data stored in the separate storing unit is read out for printing. Note that a large capacity need not be prepared and that the operator is not required to perform a deleting operation each time if the separately prepared storing unit is set such that functions to and not to store print data are provided with the unit, whereby the stored print data is deleted with the passage of a predetermined length of time or the print data previously written is deleted upon receipt of a new request for printing.

However, with the configuration of the conventional print server device shown in FIG. 1, the aforesaid problems cannot be solved.

Referring to FIGS. 2 to 7, an embodiment of a print server device according to the present invention will be described below which can solve the aforesaid problems and can increase the convenience of the print server device by improving the function thereof.

First Embodiment

Figure 2:
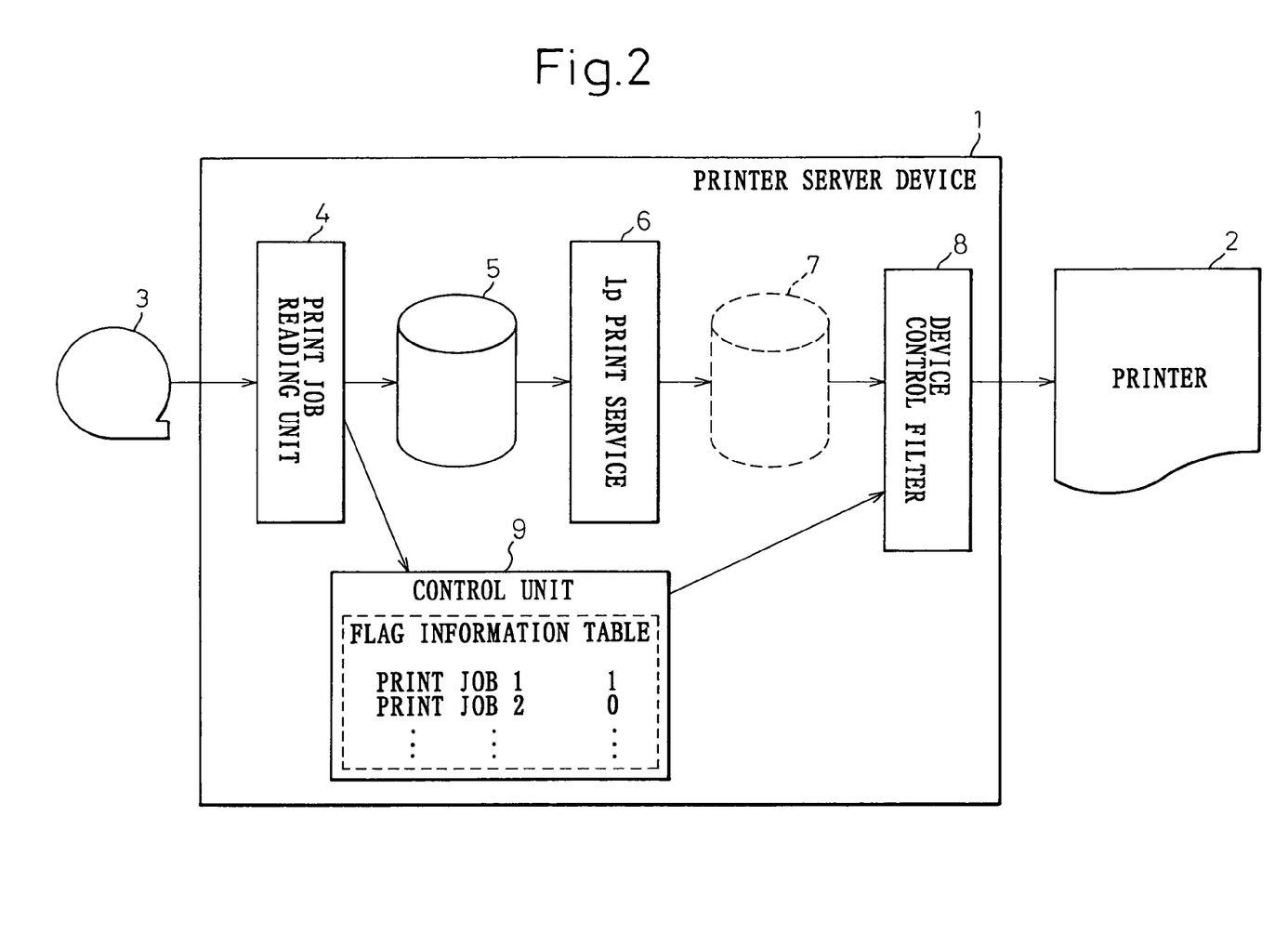
FIG. 2 is a schematic diagram showing the configuration of a print server device according to a first embodiment of the present invention.

FIG. 2 shows a specific configuration for a print server device for a print system according to the present invention. The print server device 1 comprises a print job reading unit 4, a print data storing unit 5, an lp print service unit 6, a spool file 7, a device control filter 8 and a control unit 9. Note that the print job reading unit 4, the print data storing unit 5, the lp print service unit 6, the device control filter 8 and the control unit 9 are configured so as to execute their own functions. The basic configuration of a print server device 1 shown in FIG. 2 is similar to that of a conventional print server device 1 shown in FIG. 1 and, in FIG. 2, like reference numerals are given to portions similar to those shown in FIG. 1. The print server device 1 according to the first embodiment is different from the conventional print server device in that the former device is provided with the control unit 9.

The control unit 9 has a function to set a flag for identifying the end of print data in a print file that is to be stored in the print data storing unit 5, and this flag setting function was not provided in the prior art. As shown in FIG. 2, a flag information table for storing flag information is prepared within the control unit 9, whereby the control unit 9 controls the flag information with the information table based on information supplied from the print job reading unit 4.

In the print system like this, when the print job 3 arrives at the print job reading unit 4 through a request for printing, the print job reading unit 4 reads print data of the print job and initiates the storing of a print file in the print data storing unit 5. The control unit 9 detects the initiation of the storing of the print file and sets a flag to 1. Note that this flag is 0 when the storing of the print file in the print data storing unit 5 is completed.

Then, at the time of initiation of writing the print data into the print data storing unit 5, the print job reading unit 4 sends out a print request command to the lp print service unit 6. Then, receiving this print request command, the lp print service unit 6 writes the print data stored in the print data storing unit 5 into the spool file 7.

With the prior art server device shown in FIG. 1, a print request command is sent to the lp print service unit 6 after the entirety of the print data of the print job requested has been completely stored in the print data storing unit 5. With the server device according to the first embodiment, a print request command is sent to the lp print service unit 6 and print data is written into the print data storing unit 5 as soon as the storing of the print data into the print data storing unit 5 has been initiated. Namely, the reading of the print data and processing of the same are designed to be performed at the same time in a parallel fashion.

The device control filter 8 reads out the print data written in the spool file 7 in a sequential fashion in a case where the print data of the print job in question is recognized as being read or as long as the flag sent from the control unit 9 stays at 1, and the print data so read out is then analyzed and converted for output to the printer 2. Then, the printer 2 performs printing based on data sent out from the device control filter 8.

When the print job reading unit 4 has completed the writing of the entirety of the print data into the print data storing unit 5, the control unit 9 set the flag to 0 from 1 and output a flag 0 to the device control filter 8. Here, having recognized that the flag has been set to 0, the device control filter 8 can recognize that the print file which is being analyzed and processed has been entirely written into the print data storing unit 5.

Here, if the device control filter 8 is designed to read out completely the print data that has been written in the spool file 7 under a file name in question, even if the flag becomes 0 while the print data of the print job in question is being analyzed and processed, there is no risk of the printing of the relevant print job being interrupted.

The device control filter 8 reads entirely the print data written in the print data storing unit 5 via the lp print service unit 6, carries out a print process and ends printing. Thereafter, the printer 2 is put in a wait condition.

When the printing of the requested print job has been completed, a print file in association with the print job written in the print data storing unit 5 is deleted. Alternatively, the print file is not necessarily deleted immediately after printing has been completed but may be deleted with the passage of a predetermined length of time or may be deleted at the request of the user.

Here, for example, in the event that a trouble such as a jamming occurs in the printer 2, the device control filter 8 stops the delivery of data to the printer 2 and interrupts the printing.

However, even while the printing is interrupted, the writing of the print data is performed and the print data of the print job in question continues to be written in the print data storing unit 5, and the writing of the entirety of the print data is completed. Then, detecting that the flag from the control unit 9 has been set from 1 to 0, the device control filter 8 can recognize that the print data of the print job in question remains in the print data storing unit 5 even while the printing is being carried out. Due to this, the device control filter 8 may read out the remaining print data for printing process after having waited for the recovery of the printer 2 from the trouble or may read out the print data of the print job from the beginning thereof and carries out the printing process.

Print data written in the print data storing unit 5 may be deleted after a print job in question has been completely printed, or the same data may be deleted with the passage of a predetermined length of time or through the operation by the user, this being determined depending on the writing capacity of the print data storing unit 5.

With the prior art print server device, however, in the event that trouble occurs, not only is the printing interrupted but also the print data written in the print data storing unit 5 is deleted. Due to this, in a case where the requested print job is to be re-printed, another request for printing had to be made from the beginning.

When a trouble occurs while printing is being carried out, since print data remains in the spool file 7, the lp print service unit 6 cannot read out the print data. By detecting a condition like this, even after the print data has been completely written in the print data storing unit 5, the print data should not be deleted but be held. According to this configuration, when the printer 2 is recovered from the trouble, if the already written print data is read out from the beginning for output, the re-printing of the requested print job can easily be carried out.

As has been described heretofore, being different from the prior art server device in which, after the print data has been completely written, a request for printing is sent out to the lp print service unit 6 and thereafter print data is printed, with the server device according to the present invention, since the reading of print data from a medium or a network and the printing of the print data so read are carried out in parallel, a time from receiving a request for printing until initiating printing the requested printing can be reduced, and a recovery process for re-printing due to a jam in the printer 2 can be performed at a high speed, and the necessity of resetting of the medium at the time of recovery is obviated, this functioning to reduce the load on the operator.

Note that although whether print data is being read or has been completely read is determined through the setting condition of the flag by the control unit 9, data representing the end of reading may be imparted to the end of print data at the print job reading unit 5.

In this case, before the print data of the requested print job has been completely written into the print data storing unit 5, the print data in the lp print service unit 6 is sent to the device control filter 8 for a printing process. Then, when the data imparted to the end of the print data is detected, the printing in question is interrupted, and the printer 2 is put in a wait condition.

Furthermore, even when the printer 2 is in the midst of performing the relevant printing, the print data storing unit 5 can accept the following print jobs and write them therein in a sequential fashion. When this occurs, the flag at the control unit 9 stays at 1, but since print data read out by the lp print service unit 6 under a file name of the print job is sent to the device control filter 8, the printing process can be executed sequentially.

As shown in FIG. 2, a print server device has been described heretofore in which a single printer prints a single print job, but in reality, in a print server device connected to a network, as a function inherent in the lp print service, a plurality of print jobs can be printed on a plurality of printers.

To this end, a specific example of a print server device adapted to deal with a plurality of inputs and a plurality of printers will be described in FIG. 3.

Figure 3:
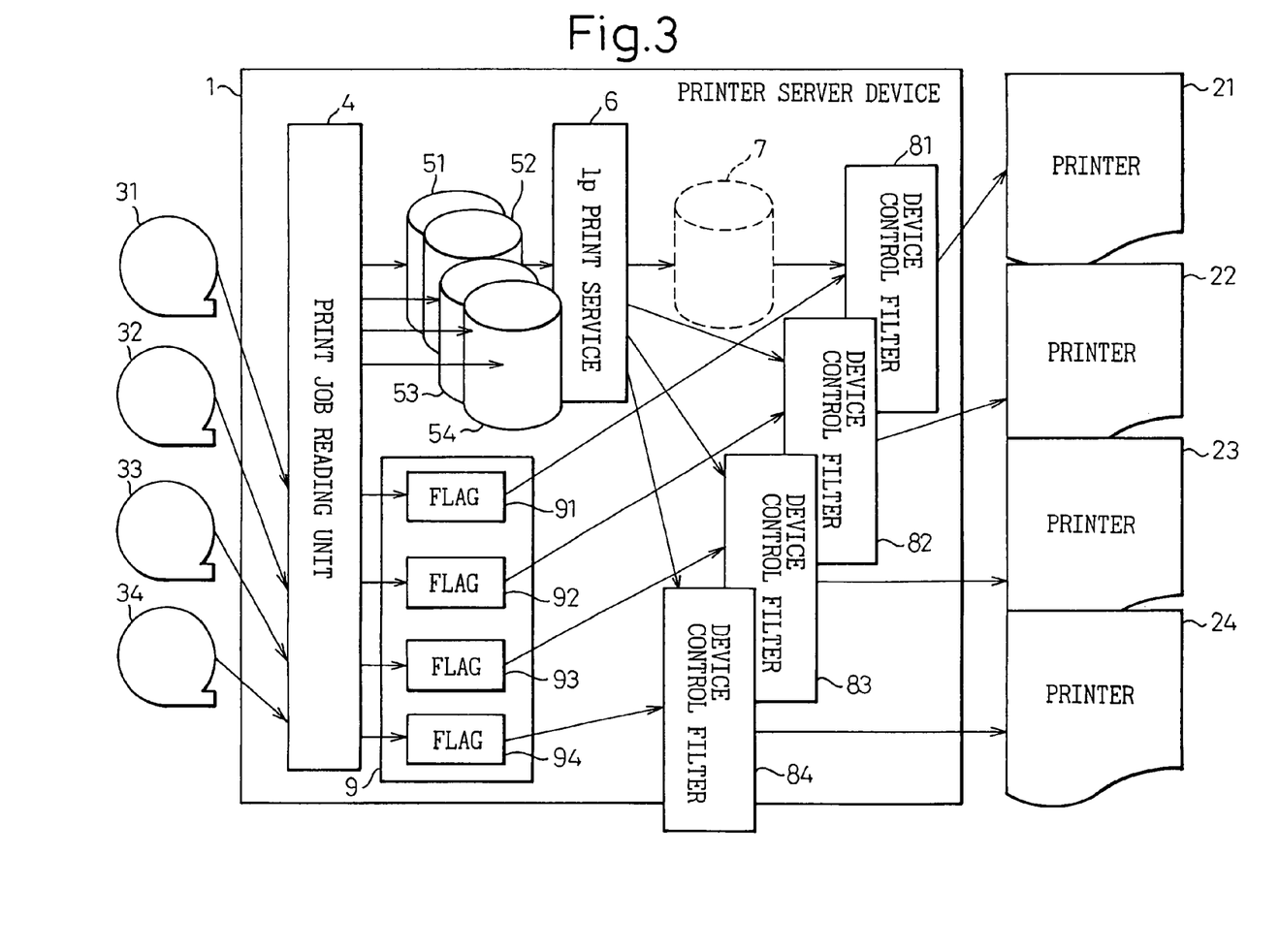
FIG. 3 is a schematic diagram showing the configuration of a print server device according to the first embodiment which is adapted to deal with a plurality of print jobs and a plurality of printers.

The configuration of a server device 1 shown in FIG. 3 is based on the configuration shown in FIG. 2, and like reference numerals are given to like portions.

The print server device 1 shown in FIG. 3 has a print job reading unit 4 and an lp print service unit 6. Further, a print data storing unit 5 comprises storing unit 51 to 54 provided for storing print data corresponding to print jobs 31 to 34. In addition, a plurality of printers 21 to 24 are connected respectively to device control filters 81 to 84 within the server print device 1, and although not shown in FIG. 3, there are provided spool files 7 corresponding to the device control filters 81 to 84. Then, similar flags 91 to 94 to those described with reference to FIG. 2 are provided in the control unit 9 so as to correspond to the print jobs 31 to 34.

Note that, although in FIG. 3 the number of printers 2 shown is made equal to the number of print jobs 3, and actually four printers and four print jobs are shown, the number of printers 2 may be smaller than that of the print jobs 3.

Next, the function of the print server 1 shown in FIG. 3 will be described below.

When requests for print jobs 31 to 34 arrive at the print job reading unit 4 sequentially, the print job reading unit 4 stores print data of the requested print files separately in respective storing unit 51 to 54. When this occurs, for example, when even a byte of the print data of the print job 31 is written in the storing unit 51, recognizing that the print data is being read, the print job reading unit 4 sets a flag 91 in the control unit 9 to 1 in correspondence with the name of the print file of the print job in question. Flags corresponding to the other print jobs 32 to 34 are similarly set in correspondence with the names of the print files.

The print job reading unit 4 writes the requested print data in the storing unit 51 to 54 for the respective files of the print jobs and informs the lp print service unit 6 of the file names of the respective print jobs 31 to 34.

Next, having received the respective file names, the lp print service unit 6 selects a printer in a wait condition and sends the print data of the respective files to respective device control filters 81 to 84 via a spool unit 7. Here, the device control filters 81 to 84 can recognize, from the file names informed by the lp print service unit 6, which print data is being processed. Then, the device control filters 81 to 84 can understand from the file names which flag among the flags 91 to 94 existing in the control unit 9 be identified, and for example, in FIG. 3, it is seen that the device control filter 81 may look at the set condition of the flag 91.

With the corresponding flags 91 to 94 being set at 1, the respective device control filters 81 to 84 judge that there is print data to be printed and sequentially read out print data designated by the respective file names from the spool file 7 to continue processing the data of the respective file names. Then, the respective printers 21 to 24 print the data which have been processed for printing.

Thereafter, the respective device control filters 81 to 84 execute operations similar to those done by the device control file 8 shown in FIG. 2 when the respective flags 91 to 94 are set to 0 from 1 and end printing the respective print jobs 31 to 34. Then, the device control filters and printers are put in a wait condition sequentially as they finish printing and then they accept the following print job 3*n*.

Note that since the flags are used only for notification of the completion of printing similarly to the print server device 1 shown in FIG. 2, the notification of such completion of printing may be carried out without using the flags and data representing the end of printing may be imparted to the end of the print data. Alternatively, the device control filters 81 to 84 may be designed to be informed of the file names and sizes of respective files responsible for printing at the printer in question. Whether or not the print data is being processed for printing may be determined.

As has been described heretofore, even with the print server device adapted to deal with the plurality of print jobs and the plurality of printers, since the reading of print data from the medium or network and the processing the same data for printing are designed to be carried out in parallel with each other, a time from receiving a request for printing until initiating printing the requested printing can be reduced, and a recovering process for re-printing due to a jam in the printer 2 can be performed at a high speed, and the necessity of resetting of the medium at the time of recovery is obviated, this functioning to reduce the load on the operator.

Second Embodiment

While in the first embodiment the functions of the print server device are improved not only to reduce the time required for processing for printing at the print server device but also to facilitate a recovery process even if there occurs a trouble in the printer, in a second embodiment, by making use of the function of lp print service, which is provided with the print server device, the print sequence is designed to automatically be changed for an accepted print job in accordance with a specific set condition.

In the second embodiment, in order to synchronize the process for changing the priority in printing with a process in which an lp print service unit performs a process for outputting to a device control filter, a hold function and a hold release function are used which are originally provided with the lp print service unit.

Here, the hold function means a function to hold a target print job stored and not to output it to the device control filter even when it is its turn to be printed, and the hold condition means a condition in which the lp print service unit does not output print data to the device control filter even when it is its turn to be printed.

Additionally, the hold release function means a function to output a print job held in the hold condition when a time for the print job to be printed comes, and a print wait condition means a condition in which the lp print service unit outputs print data to the device control filter when a time for a print job to be printed comes.

The printing sequence can be changed using these functions even if a function to set the priority is not used.

Figure 4:
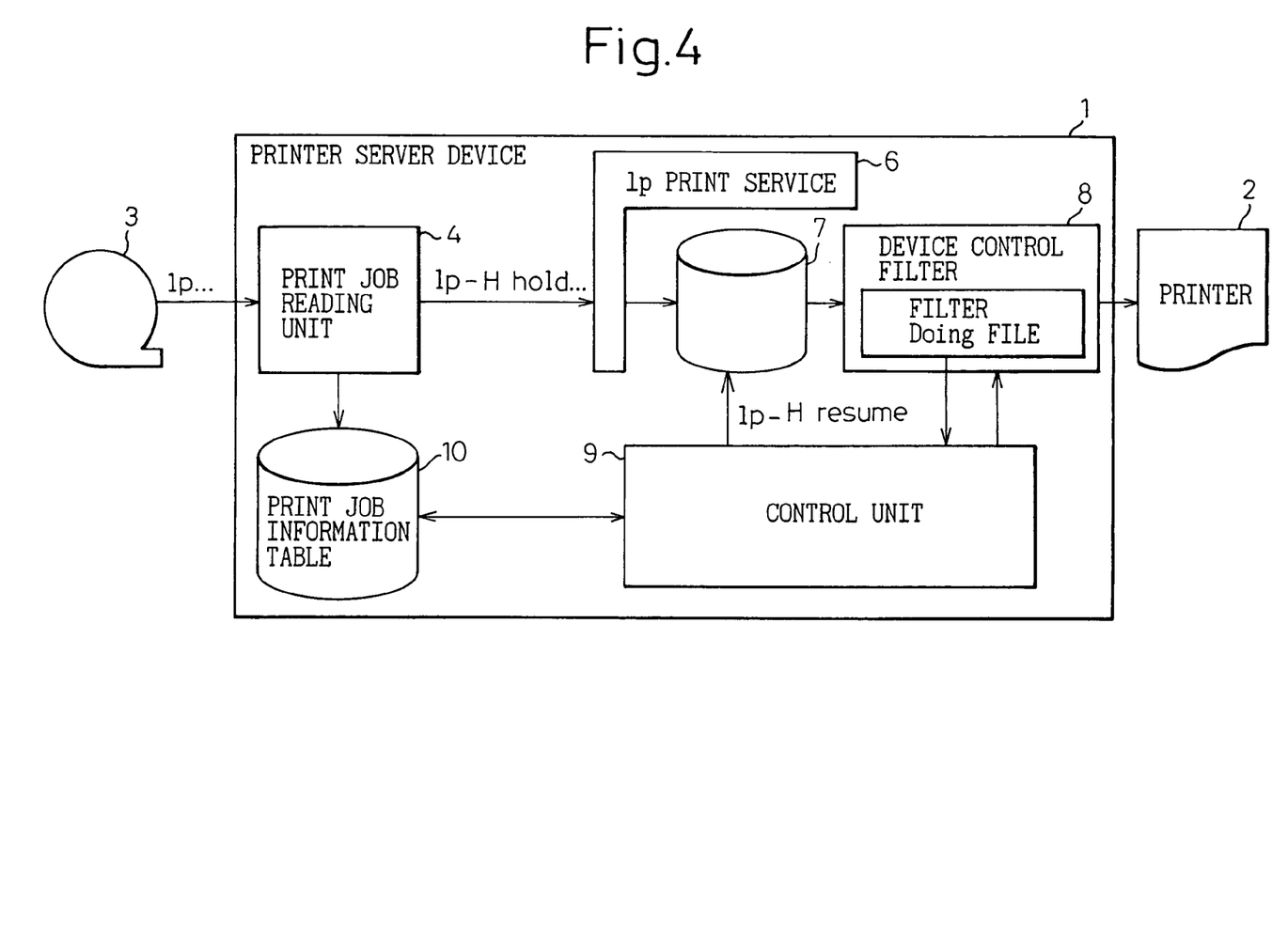
FIG. 4 is a schematic diagram showing the configuration of a print server according to a second embodiment of the present invention.

A specific configuration example of the print server device according to the second embodiment is shown in FIG. 4. The printer server device 1 shown in FIG. 4 is based on the configuration of the printer server device shown in FIG. 2, and like reference numerals are given to like portions.

However, a print information table 10 is additionally provided with the printer server device 1 shown in FIG. 4 and it can store information in association with a print job from a print job reading unit 4. Then, a function is added to the print job reading unit 4 to forcibly impart a print job 3 a command denoting a hold condition when the print job is accepted. Furthermore, a device control filter 8 is designed to create a filter doing file while outputting printing data to a printer 2.

Note that FIG. 4 mainly shows a flow of control commands, and a print data storing unit 5 is omitted and hence is not shown therein, but the print data storing unit 5 is also provided similarly to the configuration shown in FIG. 2.

Next, the function of the printer server device 1 shown in FIG. 4 will be described.

When a request for printing a print job 3 is made at the printer server device 1, the print job reading unit 4 accepts the print job 3.

With the prior art printer server device 1, as long as the user does not set a hold condition for printing, the print job reading unit 4 sends a print request command in association with a print job 3 in question to the lp print service unit 6. Then, the lp print service unit 6 proceeds with the processing by putting the print job in a print wait condition in accordance with the sent print request command.

In the printer server device 1 shown in FIG. 4, when the print job reading unit 4 accepts a print job, the print job reading unit 4 forcibly affixes to the print job 3 a command representing a hold condition. For example, a holding option "-H hold" is affixed as representing the hold condition, and the following print request command is created together with the file name of the print job.

lp -H hold to Print File

Having accepted the print job 3, the print job reading unit 4 sends the created print request command to the lp print service unit 6. In other words, whether or not a hold condition is designated, hold conditions are set for all the print jobs.

When this occurs, that a print file for the requested print job is stored in the print data storing unit 5 by the print job reading unit 4 is similar to the prior art printer server device 1, and when print jobs arrive, they are sequentially stored. Then, at this point of time, since a hold option is affixed to the print request command sent thereto, the lp print service unit 6 holds the printing of the print job in question.

With this condition being maintained, since every print job is in the hold condition, even if the request for printing has already been made, the printing continues to be held. To cope with this, the condition for the printing sequence is set in advance in the control unit 9. The priority in initiating printing print files stored in the print data storing unit 5 can be determined by the condition so set. The control unit 9 operates to release the hold condition for the name of a print file in question.

Then, specific examples will be shown below which can be realized under specific conditions set.

Assume that the print job reading unit 4 sequentially accepts print jobs Job-A to Job-E shown below.

| Job Names | User Names | Size |
|---|---|---|
| 1. Job-A | (User = ccc) | (Size = 12767) |
| 2. Job-B | (User = aaa) | (Size = 9324) |
| 3. Job-C | (User = ccc) | (Size = 54365) |
| 4. Job-D | (User = bbb) | (Size = 8835) |
| 5. Job-E | (User = aaa) | (Size = 42545) |

Here, assume that a specific condition is set in which respective print jobs are printed for each user name a, b, c in that order, hold options for the respective print request commands are released in the order shown below.

| Job Names | User Names |
|---|---|
| 1. Job-B | (User = aaa) |
| 2. Job-E | (User = aaa) |
| 3. Job-D | (User = bbb) |
| 4. Job-A | (User = ccc) |
| 5. Job-C | (User = ccc) |

Alternatively, assume that a specific condition is set in which the respective print jobs are printed in the order from the smallest to the largest, hold options for the respective print request commands are released in the order shown below.

| Job Names | Size |
|---|---|
| 1. Job-D | (Size = 8835) |
| 2. Job-B | (Size = 9324) |
| 3. Job-A | (Size = 12767) |
| 4. Job-E | (Size = 42545) |
| 5. Job-C | (Size = 54365) |

Specific conditions are set in the control unit 9 in which the respective print jobs are selected in these orders so that the respective print jobs are printed in those orders and direct a print wait condition for the lp print service unit 6 in accordance with the specific condition. Here, in order to realize a print wait condition, the hold option for the corresponding print request command is changed and a command for releasing the hold condition is created.

In a case where a print job is put in a print wait condition using the hold release function of the lp print service unit 6, for operation thereof, the control unit 9 imparts a hold release option "-H resume" representing the hold release and creates the following command to be sent to the lp print service unit 6.

Lp -I request ID -H Resume

Thus, by releasing print jobs in the hold condition from the print hold in the order in accordance with the specific condition, the lp print service unit 6 sequentially reads out print files thereof and writes in the spool 7, and the device control filter 8 performs an analyzing process based on the written print data and outputs the result of the process to the printer 2. The print file of the print data which has been completely printed is deleted with the passage of a predetermined length of time or at the time of completion of the printing.

Note that even if the user does not designate the "-H hold" at the time of making a request for printing, a print request is made forcibly in the hold condition. However, since there may be a case where the user enters a hold condition, relevant information is stored in the print job information table 10 so that a case where the user designates the "-H hold" is discriminated from a case where the user does not designate the "-H hold".

As to a hold condition in the print job information table 10, information entry for a single print job is constituted by a list of request IDs and forced hold flags.

The request ID represents information for specifying print jobs prepared by the lp print service unit 6. The forced hold flag is a flag representing that the print job reading unit 4 forcibly has created a hold condition for making a print request, and a print job in which this flag is ON or is set at 1 is released from the hold condition in response to the condition set in the control unit 9. A print job in which the flag is OFF or is set at 0 is not released from the hold condition by the control unit 9 and hence is not printed until the user clearly performs a hold release operation.

The control unit 9 confirms information on respective print jobs stored in the print job information table 10 for print files stored without being printed and deletes the print job information entries for the print jobs which have been printed and lost.

In a case where the device control filter 8 is performing a printer output process, a filter doing file is informed to the control unit 9. Then, the control unit 9 confirms that there exists no filter doing file, releases print jobs from the hold in accordance with the designated condition or for example, in the order of priority according to a specific condition of ascending or descending priority and puts the print jobs in the print wait condition.

The prior art printer server device 1 is not provided with a feature that the device control filter 8 creates a filter doing file representing that printing is under way.

As has been described heretofore, if a condition representing the printing order is set in the control unit 9 in advance or a condition representing a printing order desired by the user is left ready for entry in the control unit 9, the printing sequence can be changed through a simple operation, and automatically and freely, without performing operations for setting the priority for each printing job.

Figure 6:
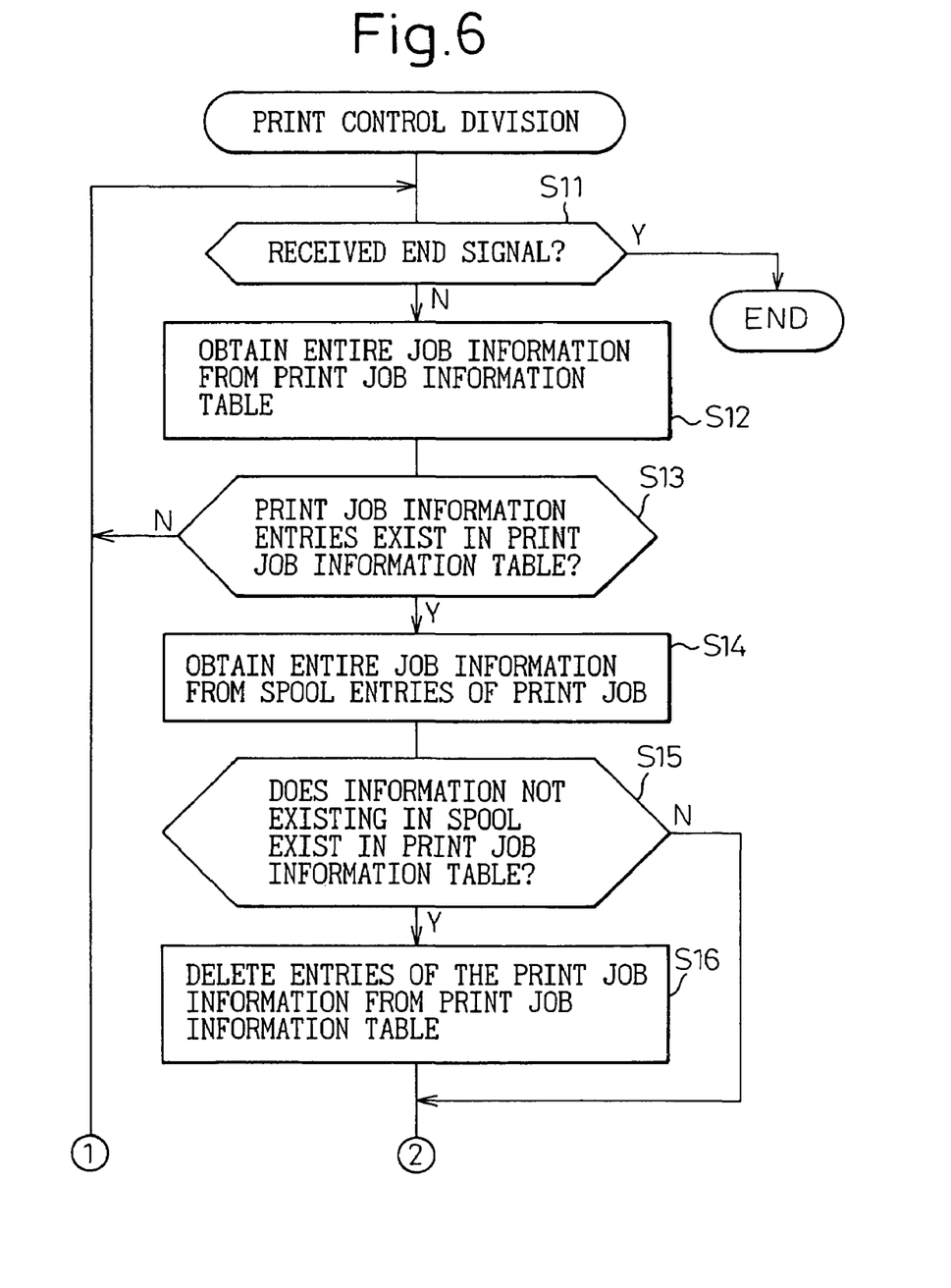
FIG. 6 is a flowchart showing an operation of a control unit of the print server device according to the second embodiment.
Figure 7:
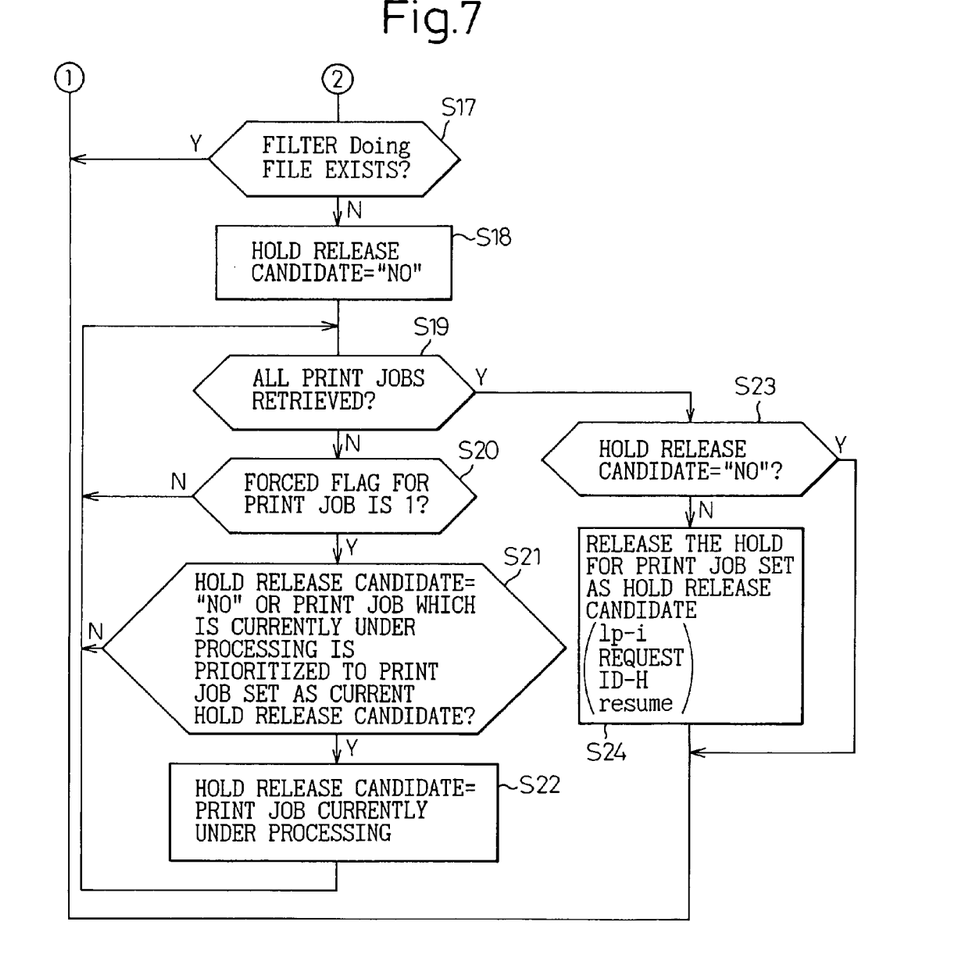
FIG. 7 is a flowchart showing an operation of the print server device which follows the flowchart shown in FIG. 6.

Next, referring to flowcharts shown in FIGS. 5 to 7, the detailed operations of the print job reading unit 4 and the control unit 9 will be described below.

Figure 5:
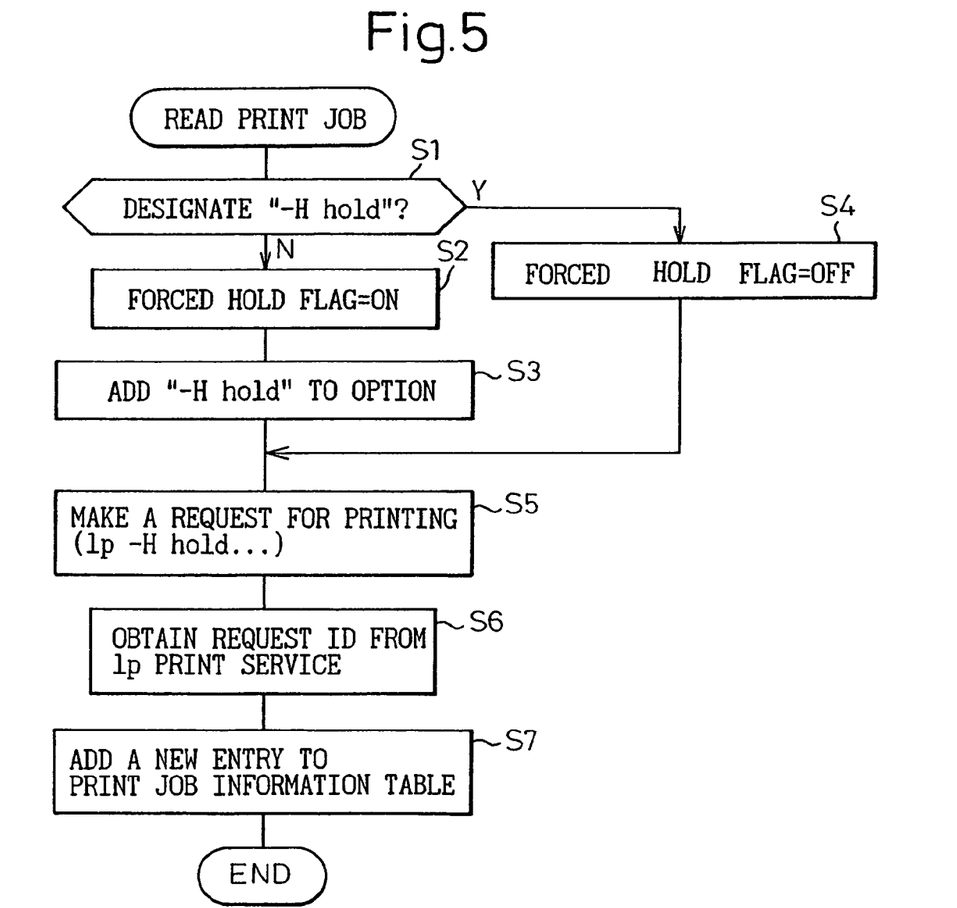
FIG. 5 is a flowchart showing an operation of a print job reading unit of the print server device according to the second embodiment.

As shown in FIG. 5, the operation of the print job reading unit 4 is initiated when the print job reading unit 4 receives a print job 3 from the user, and the print job reading unit 4 checks whether or not the received print job is provided with a hold option command "-H hold" which is designated by the user (S1).

If the hold condition is designated by the user (Y), the reading unit 4 stores a forced hold flag OFF in the print job information table 10 (S4).

At this time, the "-H hold" is already affixed to the option of the request command. On the other hand, in Step S1, if the hold condition is not designated by the user (N), the reading unit 4 stores a forced hold flag ON for the print job in the print job information table 10 (S2).

The print job reading unit 4 stores the information in the print job information table 10 and creates a print request command by adding the "-H hold" to the hold option of a request command lp (S3).

Next, the reading unit 4 completes the processes in Steps S3 and S4 and sends out a print request command for an accepted print job to the lp print service unit 6 in a state in which the option hold "-H hold" exists in the request command of every print job (S5).

Then, the reading unit 4 obtains request IDs corresponding to the request commands sent out from the lp print service unit 6 (S6) and adds another entry into the print job information table 10 (S7).

This ends the operation in which the print job reading unit 4 requests the lp print service unit 6 for printing the accepted print jobs.

Next, operations of putting the print jobs in a print wait condition by allowing the control unit 9 to release the print request commands from the hold condition in accordance with the print request command sent out to the lp print service unit 6 and of printing the print jobs in the order of specific condition with reference flowcharts shown in FIGS. 6 and 7 will be described.

First, when the control unit 9 starts to operate, in Step S11, whether or not a print end signal representing the completion of printing print jobs has been received is checked, and if the signal is received (Y), the operation of the control unit 9 ends.

If the control unit 9 has not yet received the completion representing signal (N), the control unit 9 acquires from the print job information table 10 all the information that is stored (S12).

Here, whether or not job information entries exist on the print job information table 10 is determined here (S13). Namely, the control unit 9 can grasp the accepting condition of print jobs.

In addition, if there is no job information entry (N), the control unit 9 returns to an initial state, but if there is a job information entry (Y), the control unit 9 obtains job information from all the stored print files (S14).

Then, whether or not entries of print job information which is not stored are stored in the print job information table 10 is determined (S15).

In this step S15, if entries of print job information in association with the print files which are not stored are stored in the print job information table 10 (Y), the entries of print job information are deleted from the print job information table 10 (S16). Since there exists a case where a print file in question among the stored print files has already been printed and hence is deleted but still remains in the print job information table 10, the aforesaid operations are performed, and if entries of the entire print job information on the stored print files are not stored (N), the above operations are not performed.

Next, the control unit 9 is informed whether or not the filter doing file exists in the device control filter 8 (S17). Then, if the filter doing file exists therein (Y), since the printer 2 is under processing, the control unit 9 returns to the initial state.

On the other hand, if no filter doing filter exists (N), this indicates that the printer 2 is in a wait condition. First, the hold release candidate is set "NO" (S18).

Then, the retrieval is sequentially performed for the entire print jobs (S19).

Whether or not the forced hold flag is 1 is checked with respect to the retrieved print jobs (S20). If the forced hold flag for the print job is not 1 (N), in other words, since this is a case where the user imparted a hold option, the process returns to Step S19, where the following print job is started to be retrieved, and whether or not the forced hold flag therefor is 1 is checked.

If the forced hold flag for the retrieved print job is 1 (Y), this indicates that the hold condition of the print job is not designated by the user but the hold option is added in the print job reading unit 5, and in this case, the process advances to the following step S21, where whether this print job is set as a "no" hold release candidate or the print job which is under processing in accordance with a set condition is given a higher priority than the print job set in the current hold release candidate, is determined.

Then, if there is no print job corresponding to the priority, in other words, in the case of "no" hold release candidate, the process returns to Step S19, where the retrieval of the following print job is started. On the contrary, if the print job corresponds to the condition (Y), the print job which is currently under processing is regarded as a hold release candidate (S22), the process returns to Step 19.

In Step 19, all the print jobs are retrieved (Y), and whether or not there exists a hold release candidate is determined (S23). Here, if there is a "no" hold release candidate (Y), the operation of the control unit 9 returns to the initial state, but on the contrary, if there has existed a hold release candidate (N), a hold release operation is performed on a print job set as the hold release candidate. The control unit 9 creates the following command;

lp i request ID -H resume, and sends this command to the lp print service unit 6. Then, the hold of the print job in question is released, and the print file for the print job is read out for analyzing process at the device control filter 8.

Then, the print data can be printed in a sequence following a specific condition set in the control unit 9.

Thus, in the second embodiment, the process for changing the printing priority and the process at the lp print service unit can be operated in a synchronized fashion, and as a means for effecting the synchronized operations, print jobs are always held in the hold condition, and the hold condition for a print job that is to be printed next is released in accordance with a designated condition. Due to this, the necessity of performing manual operations on each of all the print jobs is obviated, and moreover, even if a plurality of print jobs have been accepted and stored, the printing order can automatically be changed, whereby there occurs no disturbance due to a late operation, thereby making it possible to execute printing in an expected order.

As has been described heretofore, according to the embodiments of the present invention, the function of the print server device can be extended without changing the lp print service function stipulated by UNIX.

As has been described heretofore, according to the embodiments of the present invention, the function of the print server device can further be improved which is adapted to deal with a plurality of print jobs and a plurality of printers and which utilizes the lp print service function.

What is claimed is:

1. A processor comprising:
   a print data storing unit storing print data of an accepted print job;
   a spool file storing unit storing said print data read out from said print data storing unit;
   a processing unit for registering a print request command of said accepted print job, storing said print data of said print job in said print data storing unit, setting a flag information for identifying the end of storage of said print data into said print data storing unit, reading out said print data from said print data storing unit in accordance with said print request command and writing the print data to said spool file storing unit, and
   a device control filter for analyzing and processing said print data sequentially read out from said spool file storing unit, when the flag information of the print job sent from said processing unit is recognized, and outputting said print data so analyzed and processed to a printer,
   wherein said processing unit starts writing said print data read out from said print data storing unit to said spool file storing unit in accordance with said print request command, before said processing unit finishes storing said print data in said print data storing unit.

2. A processor as set forth in claim 1, wherein said processing unit informs said device control filter that the storing of said print data of said print job has been completed, and wherein said device control filter analyzes and processes said print data that had been stored in and read out from said print data storing unit to the end of said print data.

3. A processor as set forth in claim 1, wherein said processing unit can accept and register a plurality of print jobs, and wherein said device control filter can analyze and process print data of respective print jobs read out in accordance with said print request command for output to a plurality of different printers.

* * * * *